(12) United States Patent
Garcia

(10) Patent No.: US 7,273,659 B2
(45) Date of Patent: Sep. 25, 2007

(54) PHOTOCHROMIC FILM MATERIAL

(75) Inventor: Leo M. Garcia, Salem, NH (US)

(73) Assignee: Lintec Corporation, Tokyo (JP)

( * ) Notice: Subject to any disclaimer, the term of this patent is extended or adjusted under 35 U.S.C. 154(b) by 378 days.

(21) Appl. No.: 10/740,237

(22) Filed: Dec. 18, 2003

(65) Prior Publication Data

US 2005/0136260 A1   Jun. 23, 2005

(51) Int. Cl.
B32B 15/04 (2006.01)
B32B 27/06 (2006.01)

(52) U.S. Cl. .................. 428/458; 428/411.1; 428/457; 428/480

(58) Field of Classification Search ................. 428/458
See application file for complete search history.

(56) References Cited

U.S. PATENT DOCUMENTS 5,843,548 A * 12/1998 Sanders ..................... 428/40.1

6,294,251 B1 * 9/2001 Minagawa et al. ......... 428/354

FOREIGN PATENT DOCUMENTS

| JP | 8-119963 | 5/1996 |
|---|---|---|
| JP | 8-245579 | 9/1996 |
| JP | 11-158148 | 6/1999 |
| JP | 11-514695 | 12/1999 |
| JP | 2004-256780 | 9/2004 |
| JP | 2004-277416 | 10/2004 |
| JP | 2004-315728 | 11/2004 |

* cited by examiner

Primary Examiner—Monique R. Jackson
(74) Attorney, Agent, or Firm—Weingarten, Schurgin, Gagnebin & Lebovici LLP

(57) ABSTRACT

The invention is directed to a photochromic material that filters, from solar radiation, near infrared radiation and sufficient portions of ultraviolet radiation while transmitting actinic radiation in the wavelength range of about 341±5 nm. The light-transmitting photochromic material provides light and heat stability to achieve a longer useful life. This photochromic material is preferably incorporated in a multilayered structure with constituents provided on or contained within one or more layers to enhance the resistance to light fatigue.

27 Claims, 3 Drawing Sheets ed layers and photochromic dye layers, provides desired aesthetic appearance and enhanced durability. The invention will next be described in connection with certain illustrated embodiments; however, it will be clear to those skilled in the art that various modifications, additions and subtractions can be made without departing from the spirit or scope of the claims.

PHOTOCHROMIC FILM MATERIAL

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Photochromic materials are known and exhibit a change in light transmission or color in response to exposure to actinic radiation in the spectrum of sunlight. Removal of the incident radiation causes these materials to revert back to their original transmissive state.

Such photochromic materials have product applications for sunglasses, graphics, ophthalmic lenses, solar control window films, security and authenticity labels, and many others. The use of photochromic materials, however, has been very limited due to degradation of the photochromic property of the material from continued exposure to ultraviolet (UV) light radiation, particularly short wavelengths (<400 nanometers (nm)), and to infrared (IR) radiation (>780 nm). This degradation is known as "light fatigue" and is caused by chemical decomposition of the organic compounds which produce the photochromatic effect.

Photo-degradation of organic compounds involves two distinct chemical processes. One process is the absorption of UV radiation, or photolysis, and the accompanying formation of free radicals resulting from molecular bond breakage. The second process is auto-oxidation where the interaction of the free radical formed during photolysis with oxygen forms a peroxy radical, which attacks the molecular structure of the compound by hydrogen abstraction, generating another free radical. Further reaction of this free radical with oxygen leads to the formation of hydroperoxide, which generates more free radicals via photolysis.

This chemical decomposition is indicated by the gradual slowing down of the rate of bleach (inactive) to colored (activated) transformation. The total absence of reversible color change shows complete degradation or inactivation of the molecular entities responsible for the color formation. Many patents describe the use of light stabilizers in various combinations to improve the durability of photochromic articles (e.g., U.S. Pat. Nos. 4,440,672, 4,720,356, 5,000,878, 5,330,686, 5,391,327, 5,973,039, 6,083,427 and 6,262,155). However, they are insufficient for use in products involving long periods of exposure to sunlight. Therefore, there is a need for a photochromic material having improved durability and enhanced resistance to "light fatigue."

BRIEF SUMMARY OF THE INVENTION

The present invention provides a photochromic material for filtering, from solar radiation, near infrared radiation and sufficient portions of ultraviolet radiation while transmitting actinic radiation for activation of the photochromic dye. The light-transmitting photochromic material provides light and heat stability to achieve a longer useful life. This photochromic material is preferably incorporated in a multilayered structure with constituents provided on or contained within one or more layers. In one aspect, the invention comprises a multilayered structure in sheet or film form, which includes a first transparent polymeric layer having provided on a surface thereof a metallized coating which filters the infrared spectrum in the wavelength range of about 750-2100 nm and which is transmissive in the visible spectrum of about 400-750 nm. A layer of material is provided over the infrared filtering material and which is composed of a photochromic dye and a light stabilizer which is sufficiently absorptive in the ultraviolet light wavelength range of about 280-400 nm. While the material of the invention filters sufficient portions of the entire UV range, it allows certain actinic radiation to pass for the chemical changes to occur in the photochromic dye. A second transparent polymeric layer is provided over the first photochromic dye and light stabilizer layer, and a second photochromic dye and light stabilizer layer is provided over the second polymeric layer and which is the same or similar to the first dye and light stabilizer layer. A transparent backing layer which may be the same material as the first polymeric layer covers the second dye and light stabilizer layer.

Each of the first, second and backing polymeric layers may be composed of commercially available sheet or film materials, such as polyester or polycarbonate film. Exemplary films include, but are not limited to, biaxially-oriented polyethylene terepthalate (PET), Met M54™ brand aluminum-coated polymeric film, XIR®-70 brand silver-alloy-coated polymeric film, and TM-3Q™ brand gold-alloy-coated polymeric film. In one aspect, the polymeric material can be chosen depending on the degree of intended visual tint desired.

The infrared filtering layer may comprise silver, gold, copper, aluminum or various combinations or alloys of such metals depending on the desired cosmetic characteristics, that is the desired tint and transmittance of the multilayer sheet. The metallized layer is operative to filter heat, represented by the filtered infrared radiation, which is one cause of degradation of the photochromic dye.

According to the invention, the light stabilizer layer allows sufficient transmission of a narrow band of ultraviolet radiation in the wavelength range of about 341±5 nm for activation of the photochromic dye. The light stabilizer component of the first and second photochromic and light stabilizer layers filters ultraviolet light in the range of about 280 to about 400 nm, which is another source of degradation of the photochromic dye. However, in the invention, the light stabilizer allows actinic radiation, which is in the wavelength range of about 341±5 nm, to pass. In another aspect of the invention, the use of two dye and light stabilizing layers achieves a longer effective lifetime for the product since the second layer can provide intended ultraviolet filtering even after the first layer has degraded due to exposure to less filtered incident light. The concentrations of dye and stabilizer in the two layers may be the same or different to suit particular applications and intended lifetime.

In alternative embodiments, the multilayer sheet or film can have a single photochromic dye and light stabilizer layer, or the dye and stabilizer can be in respective layers. Additionally, more than two dye and stabilizer layers can be provided. The concentrations of dye and stabilizer may also be varied to suit intended performance requirements.

The photochromic light transmitting sheet of the invention having unique combinations of ultraviolet absorbing and infrared filtering properties and materials can be tailored to provide measurable changes in transmission while providing a longer useful life and photochromic stability to an enhanced resistance to light fatigue. The sequence and orientation of the multi-layered photochromic material of the invention comprising properly formulated light-stabilized layers create a tortuous pathway for the short wavelength UV radiation to be filtered, known to cause chemical degradation, thus, minimizing penetration of the short wavelength UV radiation into the photochromic material.

BRIEF DESCRIPTION OF THE FIGURES

Other features and advantages of the invention will be apparent from the following description of the preferred embodiments thereof and from the claims, taken in conjunction with the accompanying drawings, in which:

DETAILED DESCRIPTION OF THE INVENTION

Figure 1:
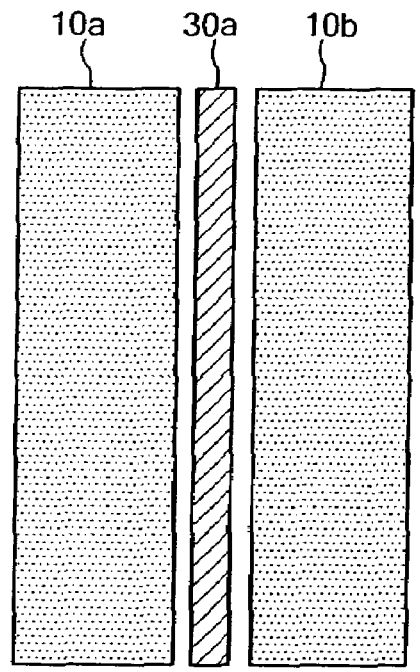
FIG. 1 is a diagrammatic representation of one embodiment of the invention.

In an embodiment of the invention, the photochromic material comprises a first filtering material for receiving incident solar radiation and operative to filter near infrared radiation, a second filtering material to filter ultraviolet radiation from the incident solar radiation, and a photochromic dye provided to receive and to be reactive to the remaining solar radiation which includes the activating radiation for the photochromic dye.

The first filtering material can be provided in a sheet that is transmissive within the usual visible spectrum and having a metallized layer which, depending on the thickness, has a visible light (400-750 nm) transmission greater than 50% and solar near infrared (750-2100 nm) reflectance greater than 60%. These transmission/reflectance values can be achieved at a metal thickness of 100-1000 angstroms (1 Å=10 nm). An ultra thin coating of metal can be applied separately onto a self-supporting polymeric sheet, e.g., polyethylene terepthalate (PET) film, and is usually fabricated by multilayers of metals to achieve the desired color correction, glare reduction and cosmetic appearance. The metallized coating can be performed by known techniques such as Physical Vapor Deposition or sputtering on a substrate or film of a clear polymer, e.g., polycarbonate, polyester, acrylic, polyurethanes, vinyl copolymers, vinylidine chloride, cellulosic polymers, PEN or PES. Preferably, an optically clear biaxially oriented polyethylene terepthalate (PET) film, 0.5 to 5.0 microns (μm) thick is employed.

The infrared filtering (or polymeric film) material comprising such metal coatings may include, but are not limited to, aluminum, silver, gold, copper or alloys containing silver/copper, silver/gold, gold/copper, or various combinations thereof. These metal coatings are applied as multi-layer stacks, with precisely controlled thickness to provide the transparency and neutral color (such as described in U.S. Pat. Nos. 4,799,745, 5,071,206, 5,306,547, 5,510,173 and 6,007,901). Typical coating thickness is around 10-50 nm.

Exemplary metallized polymeric films that are commercially available include Met M-56™ brand aluminum-coated polymeric film (Lintec Research Boston Inc.; Woburn, Mass.), XIR® brand silver-alloy-coated polymeric film (Southwall Technologies; Palo Alto, Calif.), and TM-3Q™ brand gold-alloy-coated polymeric film (Techni-Met, Inc.; Windsor, Conn.). Based on measured spectral data covering the total solar spectrum from UV-visible-near IR region, the properties are summarized below. Table I shows the emissivity of the listed materials, which represents heat absorbed by the surface and therefore indirectly gives a measure of the heat reflected. Met M-54™ brand aluminum-coated polymeric film, XIR®-70 brand silver-alloy-coated polymeric film and TM-3Q™ brand gold-alloy-coated polymeric film are all PET films that have been vacuum-coated with ultra-thin layers of metal and/or their alloys and are substantially optically transparent to visible light radiation. Met M-54™ brand polymeric film has a thin layer of aluminum having a visible light transmission around 50%. XIR®-70 brand polymeric film has a layer of silver alloy having a light transmission of 60-70%. TM-3Q™ brand polymeric film is coated with a gold alloy having a light transmission of 50-60%.

TABLE I

THERMAL FLOW PROPERTIES OF 12.5 micron FILMS*

| Spectral Region | PET | | Met. M-54 | | XIR-70 | | TM-3Q | |
|---|---|---|---|---|---|---|---|---|
| | T | R | T | R | T | R | T | R |
| Emissivity (10–12 mμ) | 0.82 | | 0.71 | | 0.61 | | 0.56 | |
| UV (280–380 nm) | 88 | 13 | 56 | 13 | 7 | 12 | 6 | 23 |
| Vis. (400–750 nm) | 88 | 12 | 48 | 12 | 62 | 12 | 60 | 42 |
| Near IR (750–2100 nm) | 87 | 10 | 36 | 12 | 11 | 61 | 7 | 73 |

T = transmittance;
R = reflectance
*The above solar property values were determined according to ASTM E-424-71 entitled "Solar Energy Transmittance and Reflectance of Sheet Materials" and also ASTM E-903-82(reapproved 1992) entitled "Standard Test Method for Solar Absorptance, Reflectance and Transmittance of Materials Using Integrating Spheres."
The spectrophotometer used was Perkin-Elmer UV-vis-near IR Spectrophotometer Model Lambda-19.

The second filtering material comprises a light stabilizer layer operative to filter selective UV radiation while transmitting actinic radiation at a wavelength of about 341±5 nm. Three main light stabilizers are available—UV absorbers (UVA), hindered amine light stabilizers (HALS) and nickel quenchers. UVA preferentially absorb the harmful UV radiation and dissipate it as harmless heat energy throughout the material matrix. These materials are light stable with high absorption over the UV range from about 280 to 400 nanometers (nm). HALS function by "trapping" free radicals formed during the photo-oxidation process. These free radicals are the precursors for more active by-products of photolysis, thus promoting a more rapid deterioration of photochromic properties. Nickel quenchers are energy transfer agents that function by "quenching" the excited state of carbonyl groups formed during photo-oxidation through the decomposition of hydroperoxides. The light stabilizer layer of the present invention comprises a combination of these stabilizers to provide optimal filtering as further described below.

The particular photochromic dye material encompasses a category of chemicals called spiroindoline oxazine. This particular type is considered to have a relatively better light fatigue resistance than other known photochromic dyes but is still subject to degradation over prolonged exposure to sunlight.

The IR filtering material, the light stabilizer and the photochromic dye can optionally be incorporated as separate layers in a multilayered structure or be provided on or contained within one or more layers. These layers can also be applied as coatings or adhesives where they can be layered-up in succession.

In one embodiment of the invention, as shown in FIG. 1, the basic structural configuration of the invention comprises two polymeric sheets 10a and 10b, each on an opposite side of a photochromic adhesive layer 30a, encapsulating the photochromic adhesive layer 30a and forming a 2-ply sandwich structure. The polymeric sheets 10a and 10b are transmissive in the usual visible spectrum. The photochromic adhesive layer 30a filters UV radiation in the range of about 280-400 nm but allows actinic radiation, which is in the wavelength range of about 341±5 nm, to pass. The photochromic adhesive layer 30a comprises a clear, homogenous solid solution of the photochromic dye and the light stabilizer material formed into a thin layer of laminating adhesive. This dried adhesive film layer is normally 5-10 micrometers thick. The polymeric layer 10a, or the first filtering layer, can negligibly remove heat. The polymer types suitable for this laminating adhesive function are, e.g., polyester, laminating adhesive ("PLAM") or aliphatic polyurethane laminating adhesive, ("ULAM").

Figure 1A:
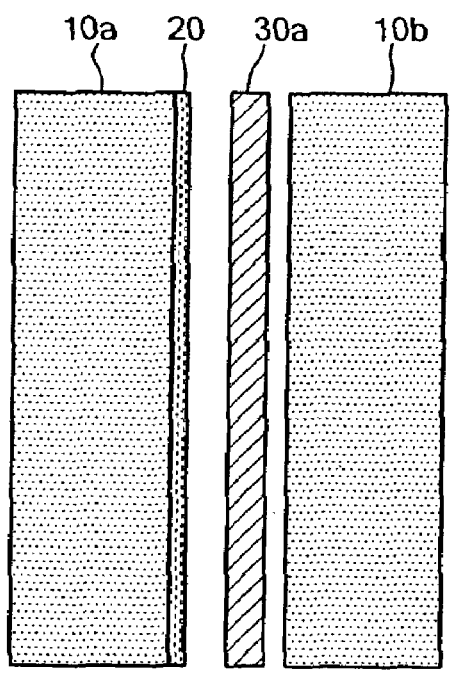
FIG. 1A is also a diagrammatic representation of one embodiment of the invention.

In another embodiment of the invention, as shown in FIG. 1A, the polymeric layer 10a can have, on one side, a thin clear photochromic coating layer 20. The photochromic coating layer 20 contains the same or a lesser concentration of photochromic dye and selective UV stabilizers as in the photochromic adhesive layer 30a that allow transmission of incident UV radiation at wavelengths necessary to activate the photochromic adhesive layer 30a for causing color formation. This is the first selective UV absorbing layer with an open window to allow transmission of UV radiation that activates the photochromic dye while substantially preventing the transmission of harmful UV radiation (less than 340 nm) that could initiate chemical degradation of the photochromic dye.

The UV absorber component in the stabilizer material of the photochromic adhesive layer 30a and the photochromic coating layer 20, is of the type that allows UV transmission >50% of wavelengths 340 nm or more at concentration levels of 5-10% by weight based on the polymer resin. The hindered amine component, which does not absorb UV radiation, is at a level of concentration in proportion to the UV absorber in this matrix. The weight ratio of UV absorber to the hindered amine could range from 3:1 to 1:3, preferably 1:1. In accordance with the invention, the novel selection of UV absorbers, which is based on their maximum absorption characteristics at a desired narrow wavelength range, creates a favorable UV transmission gradient, minimizing the harmful wavelength and maximizing the useful (actinic) UV radiation to initiate the photochromic color formation.

Figure 2:
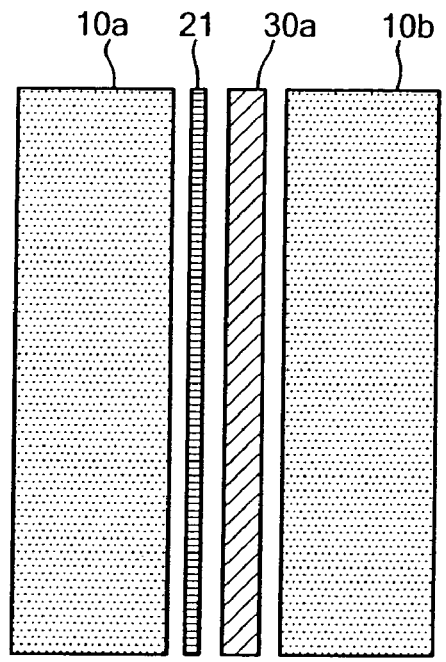
FIG. 2 is a diagrammatic representation of a second embodiment of the invention.

As shown in FIG. 2, in yet another embodiment of the invention, the polymeric layer 10a has a thin deposit of transparent/reflective metal layer 21. This vacuum deposited clear metal coating has two functions of selectively filtering infrared radiation and minimizing thermal build-up within the laminated layers that inhibit color formation and selectively transmitting the useful UV radiation to initiate photochromic activity (in the range of about 341±5 nm) and simultaneously reflect short wavelength UV radiation (in the range of about 280 to about 400 nm) that can cause chemical degradation of the photodyecontaining layers behind it. This thin infra-red filtering metal coating on layer 21 is protected against corrosion and mechanical abrasion by the adhesive carrier of the photochromic dye/light stabilizer components in layer 30a. In FIG. 2, the polymeric layer lob is shown as a backing layer to enclose the photochromic adhesive layer 30a.

Figure 3:
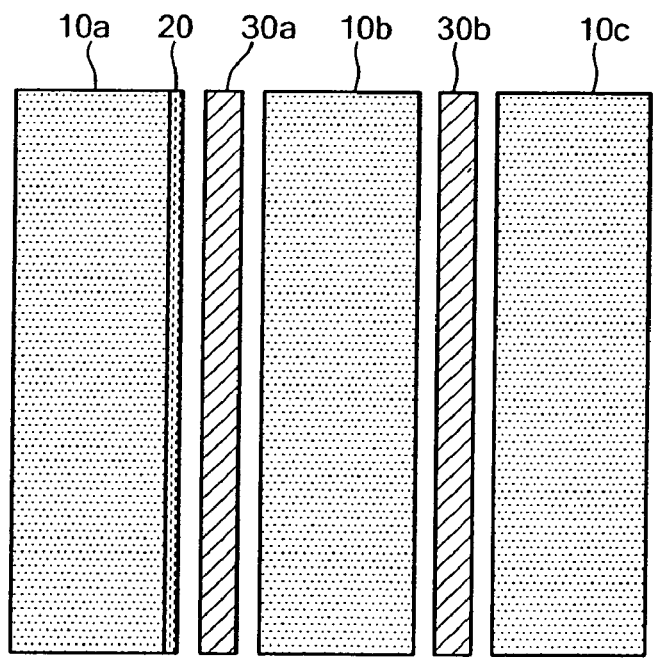
FIG. 3 is a diagrammatic representation of another embodiment of the invention.

In a further embodiment of the invention, to provide additional filtering and reduction of light fatigue, more than one photochromic layer comprising the light stabilizer material and the photochromic dye can be provided as shown in FIG. 3. While the photochromic materials comprised in layers 20 and 30a are the same as described above, this embodiment also has a third polymeric layer 10c and a second photochromic adhesive layer 30b providing a 3-ply polymeric film structure. The third polymeric layer 10c is laminated with the second photochromic adhesive layer 30b with appropriate amounts of light stabilizers to sustain the photochromic activity. This is designed to further increase the service life of the photochromic activity of the photochromic material of the invention.

Figure 4:
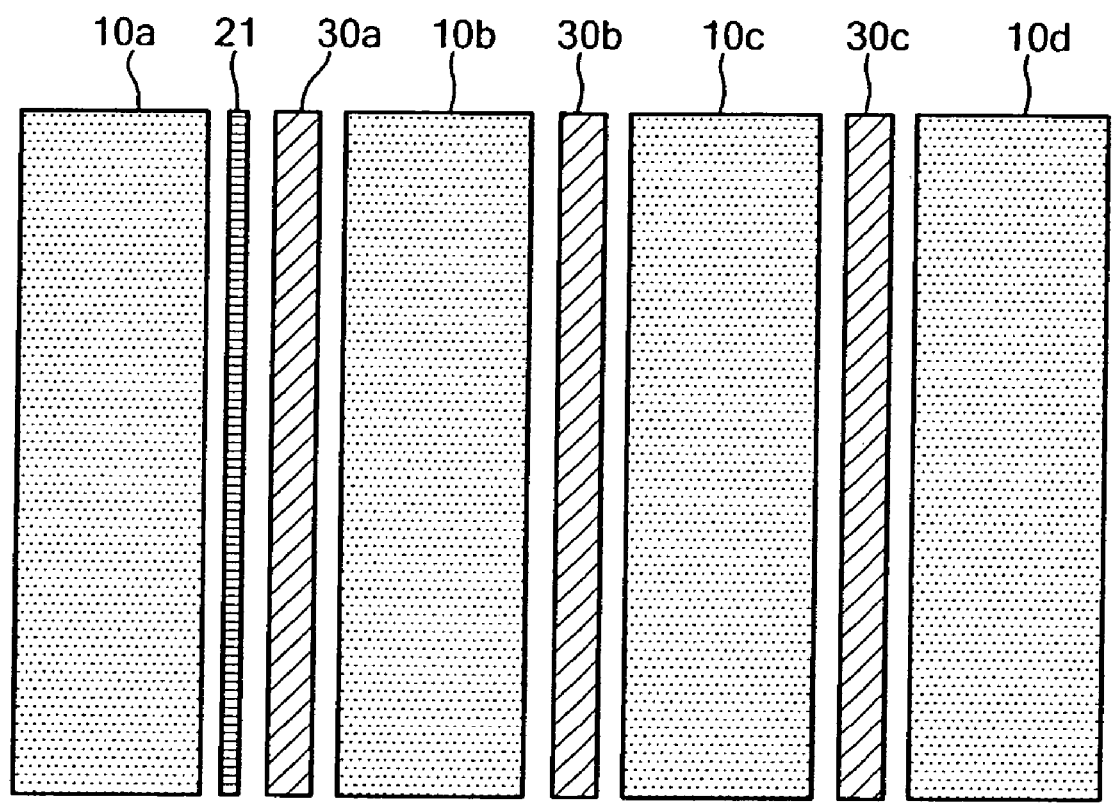
FIG. 4 depicts yet another embodiment of the invention.

In still another embodiment of the invention, FIG. 4 shows a further extension of the 3-ply laminate into a 4-ply structure with a fourth polymeric layer 10d and a third photochromic adhesive layer 30c. This subsequent layer build-up is to provide a reservoir of photochromic layers to a degree that any progressive depletion of the photochromic dye component within the preceding layers during the service life of the photochromic material of the invention is replenished by the subsequent photochromic adhesive layers built behind them. In this alternative embodiment, a vacuum-deposited metal coating layer 21 is shown to filter IR radiation and still allow transmission of actinic radiation in the wavelength range of about 341±5 nm.

The contents of all references, pending patent applications and published patent applications, cited throughout this application are hereby incorporated by reference.

EXAMPLES

The following examples are presented to illustrate the advantages of the present invention and to assist one of ordinary skill in making and using the same. These examples are not intended in any way otherwise to limit the scope of the disclosure.

The following examples provide exemplary photochromic filters according to the invention. All parts in the adhesive formulations are by weight unless otherwise noted. The sheet numbers referenced below correspond to the sheet numbers in Table II.

Example I

A 25 micrometer foil of clear polyethylene terepthalate (PET) was coated on one side with a 20% solution of an aliphatic urethane laminating adhesive in 1:1:1 by weight ethanol/toluene/methyl ethyl ketone solvent blend. This laminating adhesive consisted of 30 gms adhesive resin solution, 0.5 gm di-epoxide curing agent, 0.30 gm spiroindoline oxazine dye (commercially available material from PPG Chemicals, also known as "Photosol Blue 02-65"). The laminating adhesive solution was designated as "LAM-0", meaning no light stabilizers.

The laminating adhesive coating solution was applied to the substrate surface using a Mayer Bar, the solvents were dried off with a forced hot air gun at a dry coating thickness of 2-8 microns, equivalent to about 2-8 gms per square meter of surface area.

The rheological properties of the photochromic adhesive solutions tend to yield unacceptable smoothness of the dried coating at thickness greater than 10 microns. This optical defect was not easily discernable on the inactivated state of the photochromic sheet composite. Upon activation with UV radiation, the quality of the colored state was indicative of the coating thickness, smoothness and uniformity. Coating thickness of less than 2 microns does not yield acceptable color intensities.

An identical sheet of PET was overlaid on this adhesive-coated PET to form a 2-ply structure by hot-nipping between 2 hot rollers at surface temperatures around 100°+/−5° C. Same coating technique was used on all subsequent laminating adhesive formulations to sequentially build up multi-layer photochromic sheet products.

[PC—Sheet #01]→PET/LAM-0/PET/LAM-0/PET

Example II

A modification of LAM-0 was made by incorporating into the mix an equivalent amount (with respect to the dye) of UV absorbers 2-ethylhexyl p-methoxycinnamate, also called "Uvinul 3088" manufactured by BASF Corporation, and hindered amine light stabilizer called "Tinuvin 5050" available from Ciba-Geigy Specialty Chemicals. This light-stabilized adhesive mix was designated as "LAM-1" and was used to make another 3-ply laminate.

[PC—Sheet #02]→PET/LAM-1/PET/LAM-0/PET

Example III

A 25 micrometer foil of vacuum coated polyethylene terepthalate called IRRSil-Reflector (silver alloy), whereby the transparent metallic coating consists of a stack of thin metal layers totalling about 75 nm, was coated on the metal coating side with adhesive mix "LAM-0" and laminated to PET to make a 2-ply structure. Same coating technique was used to make a 3-ply laminate.

[PC—Sheet #03]→IRRSil/LAM-0/PET/LAM-0/PET

Another version of a 3-ply laminate was made as follows:

[PC—Sheet #04]→IRRSil/LAM-1/PET/LAM-0/PET

Example IV

Further modification of LAM-0 was made by incorporating into the mix an equivalent amount (with respect to the dye) of UV absorbers 2-(2H-Benzotriazole-2-yl)-4-methyl phenol, also known as "Tinuvin P," and 2-(5-chloro-2H-benzotriazole-2-yl)-6-(1,1-dimethylethyl)-4-methyl phenol, also known as "Tinuvin 326," which are both available from Ciba-Geigy Specialty Chemicals. This light stabilized-adhesive mix was designated as "LAM-2" and was used to make another series of 3-ply laminates.

[PC—Sheet #05]→IRRSil/LAM-1/PET/LAM-2/PET

Example V

Two other types of vacuum-coated polyethylene terepthalate were used as the heat-reflecting film in addition to the IRRSil used above. They are IRRGo and IRRAl, with extremely thin layers of gold alloy and pure aluminum providing the heat reflectance properties, respectively.

[PC—Sheet #6]→IRRGo/LAM-1/PET/LAM-0/PET
[PC—Sheet #7]→IRRGo/LAM-1/PET/LAM-2/PET
[PC—Sheet #8]→IRRAl/LAM-1/PET/LAM-0/PET
[PC—Sheet #9]→IRRAl/LAM-1/PET/LAM-2/PET

Example VI

Using the same sequential laminating techniques as in the previous examples, 4-ply photochromic sheet samples were fabricated using various laminating adhesive formulations. These multi-layered configurations are as follows:

[PC—Sheet #10]→PET/LAM-1/PET/LAM-2/PET/LAM-0/PET
[PC—Sheet #11]→IRRSil/LAM-1/PET/LAM-2/PET/LAM-0/PET
[PC—Sheet #12]→IRRAl/LAM-1/PET/LAM-2/PET/LAM-0/PET For durability testing under accelerated solar radiation exposure, 2.5×5.0 in. sheet samples were placed in the Xenon Arc Weather-O-meter Model Ci400. Exposure time was at 50- to 100-hour intervals. The test parameters were as follows: intense UV output @340 nm=0.35 $W/m^2/nm$; lamp power=3-4 Kw; air chamber temperature=50°+/−5° C.; and relative humidity=50%.

All test samples sheets were placed in frames mounted on a revolving carousel and positioned in such a manner so that their IRR Reflector film front surface face the Xenon Arc Lamp source. Photochromic activity was determined by taking out sheet samples from the Xenon Arc Weather-Ometer, allowed to equilibrate at room temperature, then "activated" by a portable UV irradiation lamp source for 30 seconds and immediately measuring the optical density using a MacBeth Densitometer Model TD 904. The portable UV lamp is manufactured by UV Products, Inc. and emits both short and long wave UV radiation.

As shown in Table II, the results indicate that certain light stabilizer systems characterized by a blend of specific UV absorbers and HALS impart light resistance and durability to photochromic sheets. Without these additives, color reversibility properties are totally gone in 100 hours or less in simulated sunlight exposure (Sheet #01). The use of transparent infra-red reflecting films on the front of a photochromic sheet article also adds to the durability, extending it to up to 300 hours (Sheet #02). The combination of infra-red reflecting films and spectrally selective UV absorbers/hindered amine light stabilizer blends incorporated into the photochromic laminating adhesive formulations to make the multilayer structures provide the optimum system for photochromic stabilization, up to 1000 hours of continuous simulated sunlight exposure.

TABLE II

% Visible Light Transmission vs. exposure hours from measured Optical densities of "activated" sample.

| | | "W-O-M" Hrs. | | | | | | | | | | |
|---|---|---|---|---|---|---|---|---|---|---|---|---|
| Sheet # | structural components | 0* | 0 | 50 | 100 | 200 | 300 | 400 | 500 | 600 | 700 | 800 | 900 |
| 01 | PET/PLAM-0/PET/PLAM-0/PET | 92 | 48 | 75 | 90 | — | — | — | — | — | — | — | — |
| 02 | PET/ULAM-0/PET/ULAM-0/PET | 92 | 50 | 75 | 90 | — | — | — | — | — | — | — | — |

TABLE II-continued

% Visible Light Transmission vs. exposure hours from measured Optical densities of "activated" sample.

| Sheet # | structural components | 0* | \multicolumn{11}{c}{"W-O-M" Hrs.} |
|---------|----------------------|-----|----|----|----|----|----|----|----|----|----|----|----|
| | | | 0 | 50 | 100 | 200 | 300 | 400 | 500 | 600 | 700 | 800 | 900 |
| 03 | PET/PLAM-1/PET/PLAM-2/PET | 92 | 54 | 54 | 54 | 64 | 82 | 91 | — | — | — | — | — |
| 04 | PET/ULAM-1/PET/ULAM-2/PET | 92 | 54 | 54 | 54 | 60 | 78 | 86 | 92 | — | — | — | — |
| 05 | IRRSil/ULAM-0/PET/ULAM-0/PET | 65 | 30 | 38 | 45 | 48 | 46 | 60 | 66 | | | | |
| 5 | IRRSil/PLAM-1/PET/PLAM-2/PET | 66 | 30 | 32 | 34 | 38 | 44 | 50 | 58 | 62 | 66 | — | — |
| 6 | IRRSil/ULAM-1/PET/ULAM-2/PET | 66 | 30 | 31 | 31 | 34 | 38 | 46 | 51 | 55 | 62 | 64 | — |
| 7 | IRRGo/PLAM-1/PET/PLAM-2/PET | 52 | 25 | 25 | 25 | 28 | 31 | 36 | 40 | 45 | 51 | 52 | — |
| 8 | IRRGo/ULAM-1/PET/ULAM-2/PET | 52 | 25 | 26 | 25 | 28 | 32 | 35 | 39 | 43 | 47 | 52 | — |
| 9 | IRRAl/PLAM-1/PET/PLAM-2/PET | 54 | 28 | 27 | 28 | 31 | 34 | 36 | 41 | 46 | 51 | 54 | — |
| 10 | IRRAl/ULAM-2/PET/ULAM-2/PET | 54 | 28 | 28 | 29 | 31 | 33 | 34 | 37 | 41 | 45 | 50 | 54 |

0* is the % visible light transmission of the "inactivated" sheet
The % transmission values increase upon aging in the Xenon Arc Weather-Ometer Model Ci400 (W-O-M), indicative of the gradual chemical degradation of the Photosol dye component incorporated into the laminating adhesive layers. Values close or equivalent to 0* indicate complete disappearance of photochromic properties. The greater the number of hrs. to reach this stage, the better the light fatigue resistance or photochromic performance of the sheet.
At a dry coating weight of 3-4 gms adhesive coating and at a dye concentration fixed at 5% based on this dry coating, applied twice per sheet, the amount of photodye dye is calculated to be around 0.35 gram per square meter area of the photochromic sheet. At least an equivalent amount the UV absorber/HALS combination is present in these coating layers.

While the present invention has been described in conjunction with a preferred embodiment, one of ordinary skill, after reading the foregoing specification, will be able to effect various changes, substitutions of equivalents, and other alterations to the compositions and methods set forth herein. It is therefore intended that the protection granted by Letters Patent hereon be limited only by the appended claims and equivalents thereof.

What is claimed is:

1. A photochromic sheet comprising:
   a first filter for receiving incident solar radiation and operative to filter infrared radiation in the wavelength range of about 750-2100 nm;
   a second filter that in combination with the first filter filters ultraviolet radiation from said incident solar radiation in the wavelength range of about 280-400 nm while transmitting a percentage of actinic radiation at about 341±5 nm that is relatively greater than an average percentage transmittance for the wavelength range of about 280-400 nm outside 341±5 nm; and
   a photochromic dye provided to receive and to be reactive to said actinic radiation.

2. The photochromic sheet of claim 1, wherein said second filter is a layer comprising a light stabilizer material and said photochromic dye.

3. The photochromic sheet of claim 2, wherein said sheet further comprises two or more layers of said photochromic dye and said light stabilizer material.

4. A transparent photochromic sheet comprising:
   a first polymeric layer operative to receive incident solar radiation and to reduce heat from said solar radiation;
   a photochromic adhesive layer, wherein said photochromic adhesive layer comprises a light stabilizer material and a photochromic dye, and wherein said photochromic adhesive layer, in combination with the first polymeric layer, filters ultraviolet radiation from said incident solar radiation in the wavelength range of about 280-400 nm while transmitting a percentage of actinic radiation at about 341±5 nm that is relatively greater than an average percentage transmittance for the wavelength range of about 280-400 nm outside 341±5 nm and is reactive to actinic radiation; and
   a second polymeric layer to cover said photochromic adhesive layer.

5. The photochromic sheet of claim 4, wherein said photochromic sheet further comprises a photochromic coating layer applied on one side of said first polymeric layer, wherein said photochromic coating layer comprises a light stabilizer material and a photochromic dye.

6. The photochromic sheet of claim 5, wherein said photochromic coating layer has an equal concentration of light stabilizer material and photochromic dye as in said photochromic adhesive layer.

7. The photochromic sheet of claim 5, wherein said photochromic coating layer has a lesser concentration of light stabilizer material and photochromic dye as in said photochromic adhesive layer.

8. The photochromic sheet of claim 4, wherein said first polymeric layer comprises a metal.

9. The photochromic sheet of claim 4, wherein said photochromic sheet further comprises a metal coating layer, wherein said metal coating layer is vacuum-deposited onto one side of said first polymeric layer.

10. The photochromic sheet of claim 8, wherein said metal is selected from the group consisting of aluminum, silver, gold, copper, alloys thereof and combinations thereof.

11. The photochromic sheet of claim 4, wherein said first polymeric layer comprises a foil of vacuum coated PET wherein one side of the foil consists of a stack of thin silver-alloy layers totaling about 75 nm and the foil is about 25μ in thickness.

12. The photochromic sheet of claim 4, wherein said photochromic dye is spiroindoline oxazine or analogues thereof.

13. The photochromic sheet of claim 4, wherein said photochromic dye is 1,3,3-trimethyl-spiro-indole-2,3'-3H-benzo[a]anthracene-7',12'-dione (3,4-6)-1,4-oxazine.

14. The photochromic sheet of claim 4, wherein said light stabilizer material is selected from the group consisting of an ultraviolet absorber, a hindered amine light stabilizer, a light quencher and a combination thereof.

15. The photochromic sheet of claim 4, wherein said light stabilizer material is a combination of a ultraviolet absorber and a hindered amine light stabilizer at a ratio of 3:1 to 1:3.

16. The photochromic sheet of claim 4, wherein said light stabilizer material is a combination of a ultraviolet absorber and a hindered amine light stabilizer at a ratio of 1:1.

17. The photochromic sheet of claim 4, wherein said first and second polymeric layers can be a polyester film or a polycarbonate film.

18. The photochromic sheet of claim 4, wherein said first and second polymeric layers are polyethylene terepthalate.

19. The photochromic sheet of claim 4, wherein said sheet further comprises a second photochromic adhesive layer and a backing polymeric layer to cover said second photochromic adhesive layer.

20. The photochromic sheet of claim 19, wherein said second photochromic adhesive layer has an equal concentration of said light stabilizer material and said photochromic dye as said first photochromic adhesive layer.

21. The photochromic sheet of claim 19, wherein said second photochromic adhesive layer has an increased concentration of said light stabilizer material and said photochromic dye as said first photochromic adhesive layer.

22. A photochromic sheet comprising:
a first transparent polymeric layer having a metal;
a photochromic coating layer on said first transparent polymeric layer that allows passage of a percentage of actinic radiation in a wavelength of about 341±5 nm, wherein said photochromic coating layer comprises a light stabilizer material and a photochromic dye;
a first photochromic adhesive layer that, in combination with the first layer, the coating layer, or the first layer and the coating layer, allows passage of a percentage of actinic radiation in a wavelength of about 341±5 nm that is relatively greater than an average percentage radiation allowed to pass for the wavelength range of about 280-400 nm outside 341±5 nm, wherein said photochromic adhesive layer comprises an equal or a greater concentration of light stabilizer material and photochromic dye as provided in said photochromic coating layer;
a second transparent polymeric layer to enclose said photochromic coating layer and said photochromic adhesive layer;
a second photochromic adhesive layer comprising an equal or a greater concentration of light stabilizer material and photochromic dye as said first photochromic adhesive layer; and
a backing transparent polymeric layer provided over said second photochromic adhesive layer.

23. The photochromic sheet of claim 22, wherein said metal is selected from the group consisting of aluminum, silver, gold, copper, alloys thereof and combinations thereof.

24. The photochromic sheet of claim 22, wherein said first transparent polymeric layer comprises a foil of vacuum coated PET wherein one side of the foil consists of a stack of thin silver alloy layers totaling about 75 nm and the foil is about 25µ in thickness.

25. The photochromic sheet of claim 22, wherein said first, second and backing transparent polymeric layers are polyethylene terepthalate.

26. A photochromic sheet comprising:
a first transparent polymeric layer;
a metal coating layer vacuum deposited onto said first transparent polymeric layer;
a first photochromic adhesive layer applied onto said metal coating layer that allows passage of actinic radiation in a wavelength of about 341±5 nm, wherein said photochromic adhesive layer comprises a light stabilizer material and a photochromic dye;
a second transparent polymeric layer to enclose said metal coating layer and said photochromic adhesive layer on one side;
a second photochromic adhesive layer provided on the other side of said second transparent polymeric layer;
a third transparent polymeric layer provided over said second photochromic adhesive layer;
a third photochromic adhesive layer provided over said third transparent polymeric layer; and
a backing transparent polymeric layer provided over said third photochromic adhesive layer.

27. The photochromic sheet of claim 26, wherein said first, second, third and backing transparent polymeric layers are polyethylene terepthalate.

* * * * *

UNITED STATES PATENT AND TRADEMARK OFFICE
CERTIFICATE OF CORRECTION

PATENT NO. : 7,273,659 B2  Page 1 of 1
APPLICATION NO. : 10/740237
DATED : September 25, 2007
INVENTOR(S) : Leo M. Garcia It is certified that error appears in the above-identified patent and that said Letters Patent is hereby corrected as shown below:

Column 6, line 1, "layer lob" should read --layer 10b--; and

Column 10, claim 13, line 58, "indole" should read --indoline--.

Signed and Sealed this

Sixth Day of May, 2008

JON W. DUDAS
*Director of the United States Patent and Trademark Office*